United States Patent [19]

Wallace

[11] Patent Number: 5,502,099
[45] Date of Patent: Mar. 26, 1996

[54] MOLDING COMPOSITIONS

[75] Inventor: Lawrence R. Wallace, Evansville, Ind.

[73] Assignee: General Electric Company, Pittsfield, Mass.

[21] Appl. No.: 71,201

[22] Filed: Jun. 2, 1993

Related U.S. Application Data

[63] Continuation of Ser. No. 640,021, Jan. 10, 1991, abandoned, which is a continuation of Ser. No. 424,543, Oct. 20, 1989, abandoned.

[51] Int. Cl.$^6$ .................................................. C08K 3/10
[52] U.S. Cl. ........................ 524/413; 524/432; 524/436; 523/136; 523/137
[58] Field of Search ........................ 524/413, 432, 524/436; 523/136, 137

[56]  References Cited

U.S. PATENT DOCUMENTS

| Re. 31,992 | 9/1985 | Ancker et al. | 523/202 |
|---|---|---|---|
| 3,462,389 | 8/1969 | Schulde et al. | 260/41 |
| 4,043,971 | 8/1977 | Wurmb et al. | |
| 4,353,817 | 10/1982 | Nakae et al. | 524/232 |
| 4,483,958 | 11/1984 | Kosaka et al. | 524/413 |
| 4,548,979 | 10/1985 | Weise et al. | 524/413 |
| 4,687,692 | 8/1987 | Akao | 428/137 |
| 4,722,959 | 2/1988 | Inoue et al. | 524/412 |
| 4,732,928 | 3/1988 | Mizushiro et al. | 524/423 |
| 4,732,939 | 3/1988 | Hoshi et al. | 525/106 |
| 4,734,450 | 3/1988 | Kawai et al. | 524/413 |
| 4,790,965 | 12/1988 | Thorsrud | 523/137 |
| 4,916,170 | 4/1990 | Nambu et al. | 523/137 |

FOREIGN PATENT DOCUMENTS

| 0019926 | 12/1980 | European Pat. Off. . |
|---|---|---|
| 53-102381 | 9/1978 | Japan . |
| 102381 | 9/1978 | Japan . |
| 231763 | 11/1985 | Japan . |
| 60-231763 | 11/1985 | Japan . |
| 285235 | 12/1986 | Japan . |
| 61-285235 | 12/1986 | Japan . |
| 63-241036 | of 1988 | Japan . |
| 62-252460 | 11/1988 | Japan . |

OTHER PUBLICATIONS

Ken–React Reference Manual, Kenrich Petrochemicals Inc. Bulletin #1084L, Feb. 1985 see p. 95.

*Primary Examiner*—Edward J. Cain

[57]  ABSTRACT

This invention provides flexible compositions which have 20–90% by total weight of composition of a filler selected from the group consisting of barium sulfate, zinc oxide, zirconium oxide, zirconium silicate and mixtures thereof, and a thermoplastic resin, which when filled with 20–90% by total weight of composition of the filler, has a flexural strength of less than 7500 psi.

5 Claims, No Drawings

MOLDING COMPOSITIONS

"This is a continuation of Ser. No. 07/640,021, filed Jan. 10, 1991, now abandoned; which is a continuation of Ser. No. 07/424,543, filed Oct. 20, 1989, also now abandoned."

BACKGROUND OF THE INVENTION

Generally in the prior art it has been known to use mineral fillers to modify the properties of flexible thermoplastic resins. These thermoplastics resins were filled at low levels because it would be expected that high levels of fillers would adversely affect the physical properties of the resins. It has been found that with fillers selected from the group consisting zinc oxide, barium sulfate, zirconium oxide, zirconium silicate or mixtures thereof, it is possible to incorporate, up to 90% by total weight of composition, of filler. These filled flexible thermoplastics are opaque to x-rays and may be molded or thermoformed into x-ray barriers for use in protecting radiation sensitive materials such as photographic film. These materials may also be formed into structural elements, that may be used to protect medical and industrial personnel from exposure to direct x-radiation or reflected x-rays.

The flexible thermoplastic resins within the scope of the invention include those which when filled with from 20–90% by total weight of composition of barium sulfate, zinc oxide, zirconlure oxide, zirconium silicate or mixtures thereof, are substantially free of internal voids and will have a flexural strength of less than 7500 psi when tested according to ASTM D-790.

Accordingly, it is a primary object of the invention to provide novel thermoplastic molding compositions which include high levels of fillers and are flexible.

It is also an object of this invention to provide novel thermoplastic molding compositions which have good surface properties and may be molded into complex shapes.

It is also an object of this invention to provide novel thermoplastic molding compositions which have a density greater than 1.0.

These and other objects of the invention will become apparent from a review of the present specification.

SUMMARY OF THE INVENTION

The invention provides novel thermoplastic molding compositions which comprise (a) from 20–90% by total weight of a filler selected from the group consisting of barium sulfate, zinc oxide, zirconium oxide, zirconium silicate and mixtures thereof; and (b) a thermoplastic resin which when filled with from 20–90% by weight of barium sulfate, zinc oxide, zirconium oxide, zirconium silicate and mixtures thereof, has a flexural strength of less than 7500 psi.

DETAILED DESCRIPTION OF THE INVENTION

The resins useful in the practice of the invention include olefin resins, such as low density polyethylene (d=about 0.920); high density polyethylene (d=above 0.94); linear low density polyethylene (d=0.916–0.940) or polypropylene; EPDM; ethylene vinyl acetate copolymer; EEA; engineering TPEs such as polyether imide esters; olefin TPEs; polyurethane TPEs; flexibilized PVCs; elastomeric alloy TPEs; FEP; thermoplastic elastomers such as AB and ABA block copolymers; ABS with at least a content of 45% butadiene by weight; and mixtures thereof. These materials are well known and are described in Modern Plastics Encyclopedia, 1988 Edition, pp. 1–124, which is incorporated by reference. The polyetherimide esters are described in U.S. Pat. No. 4,544,734, which is incorporated by reference.

The zinc oxide may be in the form of zincite or as synthetically produced white zinc oxide produced by the indirect French process using zinc metal or metallic residues or the American process by using zinc residues in a wet chemical process. A finely divided form is preferred which has an average particle diameter of 0.05–50 microns, preferably 0.1–5 microns and most preferably about 1.5 microns.

The barium sulfate may be in the form of naturally occuring barytes or as synthetically derived barium sulfate using well known synthetic techniques. The particle size may vary from 0.5 to 50 microns, preferably from 1 to 15 microns and most preferably 8 microns.

The zirconium oxide occurs as baddeleyite or it may be prepared using well known procedures. A particle size of 0.1 to 50 microns may be utilized.

Zirconlure silicate may be used as zircon or it may be made synthetically using known procedures. A particle size of 0.1 to 50 microns may be used.

In most applications, the zinc oxide, barium sulfate, zirconium oxide, zirconlure silicate or mixtures thereof, may be employed alone. All of these materials or any two or three of these materials may be used in combination. In addition, in place of the individual or combinations of these fillers, one may utilize up to 50% by weight of the total filler contents and more preferably 15% by weight may be replaced with an inorganic filler, such as alumina, amorphous silica, anhydrous aluminum silicate, barium ferrite, calcium carbonate, mica, feldspar, clays such as kaol in, talc, magnesium oxide, magnesium silicate, nepheline syenite, phenolic resins, glass microspheres, wollastonite, titanium dioxide, ground quartz and the like.

The molding compositions may include a resin selected from the group set forth hereinabove with from 20–90% by weight, preferably 30–75% by weight or most preferably 30–45% by weight of total composition of the filler component.

Preferred compositions will have 25–65% by weight of total composition of a resin selected from the group consisting of polypropylene, low density polyethylene, poly-(ethylene-co-ethylacrylate), polyetherimide ester and 35–75% by weight of total composition of a filler selected from zinc oxide and barium sulfate.

The preferred compositions are dense and will have a density of above 1.0 and preferably, above 1.5. The density will depend on the level of loading of the filler.

The external lubricants function as mold release agents and the particular material is not critical. The external lubricants may be used at 0.01–5% and preferably at 0.1–0.5% by weight of composition. They will include compounds having a long non-polar backbone such as a carbon chain of 12–60 carbons. Examples include fatty acids; various esters including fatty esters, wax esters, glycerol esters, glycol esters, fatty alcohol esters, fatty alcohols, fatty amides, metallic stearates; and waxes. Those materials are described in Modern Plastics Encyclopedia, 1988 Edition, p. 162, which is incorporated by reference.

The additive pentaerythritol tetrastearate is a dispersing agent for the barium sulfate and zinc oxide, in the base resin and will also function as an external lubricant or mold release agent.

Suitable antioxidants include phosphites, hindered phenols, secondary amines and the like, which may be added in effective amounts to retard oxidative degradation. The preferred antioxidant is tetrakis(methylene-3(3',5'-di-tert-butyl-4-butyl-4-hydroxyphenyl)propionate) methane.

Flame retardants may be added in effective amounts for molding articles such as wastepaper baskets which should be flame retardant. Suitable flame retardant agents are disclosed in U.S. Pat. Nos. 4,785,592; 3,334,154 and 4,020,124.

Other additive polymers which are compatible with the particular resin which is used may be added to the blend in amounts which are less than 10% by weight of the total amount of resin. These polymers may be utilized alone or in combination at levels which are compatible with the resin and filler. Generally, it will be preferred to limit the amount of the additive polymer to less than 5% by weight of total composition. Suitable thermoplastic polymer resins include polybutylene terephthalate and copolymers and branched copolymers thereof, polyethylene terephthalate, polypropylene terephthalate and copolymer thereof; polycyclohexyl terephthalate and copolymers thereof, polycarbonates, modified polyphenylene ethers, polyphenyene sulfide, polyetherimide and copolymers thereof, polyimide, PVC, ASA copolymers and the like. These materials are well known and are described in Modern Plastics Encyclopedia, 1988 Edition, pp. 1–109, which is incorporated by reference. The ASA copolymers are disclosed in U.S. Pat. No. 3,944,631, which is incorporated by reference.

The composition may be prepared by tumble blending the powdered components, extruding the blend, chopping the extrudate and thereafter, fabricating the composition using conventional procedures such as injection molding, blow molding, thermoforming and the like.

It is preferred to use a devolatilizing extruder although other types of mixing equipment may be employed.

When molding the composition of the invention, the surface properties can be optimized by increasing the mold or melt temperature, e.g., a mold temperature of 120° F.–240° F. and melt temperature from 350° F.–375° F. may be of use for polycarbonates. The molecular weight of particular polymers may require different temperatures for optimum surface properties.

If desired, fiberglass reinforcing fillers may be added as well as pigments, ultraviolet stabilizers, impact modifiers, metal additives for electromagnetic radiation shielding such as nickel coated graphite fibers, antistatic agents, coupling agents such as amino silanes and the like.

If a fiberglass reinforcing filler is used, a level of 1–45% by weight of total composition may be used or more preferably 5–15%. The invention also includes compositions based on the novel filler and flexible thermoplastics described hereinabove, which are made rigid, i.e., have a flexural strength (ASTM D780) of more than 8500 psi by the addition of a sufficient amount of a reinforcing filler such as fiberglass.

Materials suitable for use as impact modifiers include SBR, AB and ABA block copolymers such as Kraton and Kraton-G; styrene-butadiene modified acrylics; acrylic modifiers such as EXL 2330; core shell acrylics such as EXL 2691; EVA and EEA polymers. These and other impact modifiers are described in U.S. Pat. Nos. 4,034,013; 4,096,202 and 4,180,494 and in Modern Plastics Encyclopedia, 1988 Edition, p. 160, which is incorporated by reference. Effective amounts range from 1–20% by total weight of composition.

EXAMPLE 1

Compositions having the following components are prepared by tumble blending the components, extrusion through a 2½" diameter, single screw, HPM devolatizing extruder with a melt temperature of 350° F. The compositions are molded on an 80 TON Van Dorn injection molding machine with 3.5 ounce barrel, melt temperature of 350° F., and mold temperature of 150° F.

|  | 1 |
|---|---|
| Low density polyethylene[1] | 40.0 |
| Barium sulfate (3 micron av. particle size from Pfizer) | 60.0 |
| Flexural Strength; psi | 1720 |
| Tensile Elongation; % | 60 |
| Tensile Strength; psi | 2020 |
| Izod impact, notched; ft. lbs./in. | 1.8 |
| Izod impact, unnotched; ft. lbs./in. | No Break |
| Specific Gravity | 1.65 |
| Heat distortion temperature at 264 psi; °F. | 95 |

[1]USI PE831 from Quantum Chemical, with 0.92 density and an MI of 9 gm/10 min. (ASTM D1238).

It is surprising the tensile elongation is good, and the unnotched Izod bars do not break, because one would expect a material with this high filler loading to be much poorer.

EXAMPLE 2

Compositions having the following components are prepared following the general procedure of Example 1:

|  | 2 |
|---|---|
| Poly(ethylene-co-ethyl acrylate)[1] | 40.0 |
| Barium sulfate (3 micron av. particle size from Pfizer) | 60.0 |
| Flexural strength; psi | 1100 |
| Tensile elongation; % | 67 |
| Tensile strength; psi | 1360 |
| Izod impact, notched; ft. lbs./in. | 6.5 |
| Izod impact, unnotched; ft. lbs./in. | No Break |
| Specific Gravity | 1.70 |
| Heat distortion tempearature at 264 psi; °F. | 71 |

[1]Union Carbide DPD 6169 with 18% ethyl acrylate comonomer content, and with an MI of 6.0 gm/10 min. (ASTM D1238).

It is surprising the tensile elongation is good, the notched Izod is very good, and the unnotched Izod bars did not break, because materials with very high filler loadings would be expected to be much poorer.

EXAMPLE 3

Composition with the following components are prepared following the general procedure of Example 1, with an extrusion and molding melt temperature of 450° F., and a mold temperature of 150° F.

|  | 3 |
|---|---|
| Polypropylene[1] | 60.0 |
| Barium sulfate (3 micron av. particle size from Pfizer) | 40.0 |

|  | 3 |
|---|---|
| Flexural strength; psi | 4180 |
| Tensile elongation; % | 478 |
| Tensile strength; psi | 3400 |
| Izod impact, notched; ft. lbs./in. | 2.5 |
| Izod impact, unnotched; ft. lbs./in. | No Break |
| Specific Gravity | 1.72 |
| Heat distortion temperature at 264 psi; °F. | 136 |

[1]USI 8602 polypropylene homopolymer from Quantum Chemicals, with MI of 2.5 g/10 min.

It is surprising and not expected the unnotched Izod to be no break, and the tensile elongation to be good, because one would not expect these properties with very high filler loadings.

EXAMPLE 4

Compositions having the following components are prepared by tumble blending the components, extrusion on a ¾" Davis-Standard single screw extruder, with a melt temperature of 430° F. They are dried and molded on an 80 TON Van Dorn injection molding machine at a melt temperature of 420° F., and a mold temperature of 100° F.

|  | 4 | 4A |
|---|---|---|
| Polyetherimide ester[1] | 40 | 20 |
| Barium sulfate (3 micron av. particle size from Pfizer) | 60 | 80 |
| Flexural strength; psi | 1800 | 2450 |
| Flexural modulus; psi | 30310 | 51000 |
| Tensile elongation; % | 51 | 6 |
| Tensile strength; psi | 1810 | 1620 |
| Izod impact, notched; ft. lbs./in. | 2.1 | 0.8 |
| Specific Gravity | 2.07 | 2.43 |

[1]LOMOD J1013 polyetherimide ester with 10,000 psi flexural modulus

I claim:

1. A molding composition which consists essentially of:
   (a) from 30–75% by total weight of composition of barium sulfate;
   (b) from 25–65% by total weight of composition of polyetherimide ester resin; and
   (c) from 0.01 to 5% by total weight of composition of an antioxidant.

2. A molding composition as defined in claim 1, which further includes 1–45% by weight of total composition of fiberglass.

3. A molding composition, comprising:
   from 30 to 75% by total weight of composition of barium sulfate; and
   from 25 to 65% by total weight of composition of polyetherimide ester resin.

4. The molding composition of claim 3, which further includes from 1 to 45 by weight of total composition of fiberglass.

5. The molding composition of claim 3, which further includes from 1 to 20 by weight of total composition of an impact modifier.

* * * * *